Patented Mar. 11, 1930

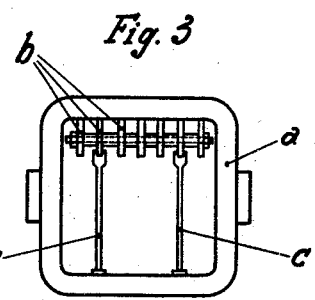
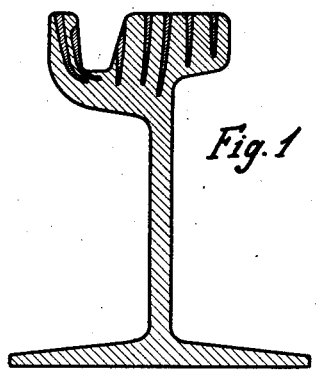
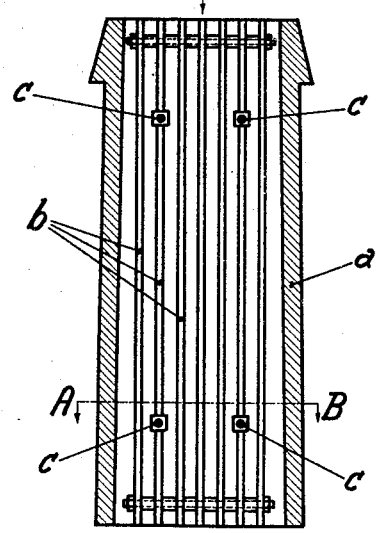
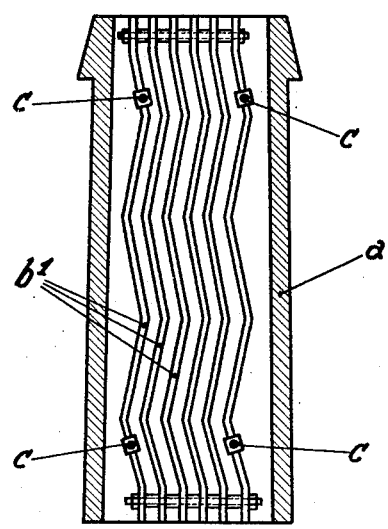
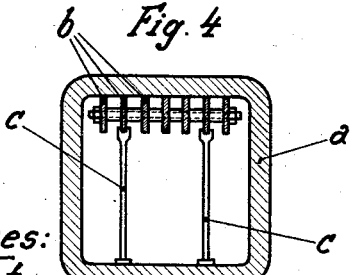

1,750,365

UNITED STATES PATENT OFFICE

MAX SCHNEIDER, OF DUISBURG-RUHRORT, GERMANY, ASSIGNOR TO THE FIRM VEREINIGTE STAHLWERKE AKTIENGESELLSCHAFT, OF DUSSELDORF, GERMANY

RAIL

Application filed February 15, 1929, Serial No. 340,134, and in Germany February 27, 1928.

This invention relates to an improved rail for railway- and tramway-lines, the head of which is particularly wearproof. The novelty consists in that for making the head wearproof not the whole head or its whole surface is manufactured of the expensive special material, but only parts of the head consist of such material, whereby said parts in form of strips running in longitudinal direction with the rail head are included in the latter.

For manufacturing such rails, the said strips of special material, for instance of hard steel, are inserted into the mould and thereupon cast around with the usual material, whereupon the so manufactured block is rolled out by a known process in such a way that the insertions of the wearproof material come to lie in the head respectively in the guide-planes of the rail.

In the accompanying drawing the subject of the invention is illustrated.

Fig. 1 shows the cross-section of a grooved rail with inserted strips of special material, the arrangement of the strips, after the block has been rolled out, being here visible in the rail head.

Fig. 2 shows a longitudinal section of a mould with the inserted strips of special material.

Fig. 3 shows a top view of the mould shown in Fig. 2, while

Fig. 4 is a section on the line A—B of Fig. 2.

Fig. 5 shows, similar to Fig. 2, a longitudinal section of the mould with inserted strips, the strips being here of another form, for instance of zigzag form.

As shown in Figs. 2 to 4, the strips $b$ of special material, for instance of hard steel, which may be connected with another by screw connection, are inserted into the mould $a$ like a grate or the like, whereby said grate is pressed against the walls of the mould by props $c$ or the like means. The parts by which the strips are screwed together do not injure the finished rail, as said parts, which are cut away after the block has been rolled out, are also situated in the lost heads.

In the form of construction shown in Fig. 5 the strips $b^1$ of special material are of zigzag form, so that the insertions in the finished rail run also in zigzag form, whereby an equal wear of all parts of the rail head and also of the vehicle wheels is obtained. Instead of zigzag form, the strips may be of any other suitable form, for instance of snake or the like form.

In order to obtain a good and intimate connection between strips and material before their casting around with the material the strips may be cleaned in any way from rust, sinter or the like impurities.

What I claim, is:

A method of manufacturing rails of railway- and tramway-lines, consisting in bringing insertions of special material like hard steel in form of a grate into the mould, in pressing said insertions against the walls of the mould by props, and in casting the rail around said insertions, for the purpose set forth.

In testimony whereof I have hereunto set my hand.

MAX SCHNEIDER.